US009164988B2

(12) United States Patent
Blodgett et al.

(10) Patent No.: US 9,164,988 B2
(45) Date of Patent: Oct. 20, 2015

(54) METHODS AND SYSTEMS FOR THE DYNAMIC CREATION OF A TRANSLATED WEBSITE

(75) Inventors: Dean S. Blodgett, Tewksbury, MA (US); Øyvind Kaldestad, Littleton, MA (US); Gal Steinberg, Chestnut Hill, MA (US)

(73) Assignee: Lionbridge Technologies, Inc., Waltham, MA (US)

( * ) Notice: Subject to any disclaimer, the term of this patent is extended or adjusted under 35 U.S.C. 154(b) by 700 days.

(21) Appl. No.: 13/179,881

(22) Filed: Jul. 11, 2011

(65) Prior Publication Data

US 2012/0185236 A1    Jul. 19, 2012

Related U.S. Application Data

(60) Provisional application No. 61/432,987, filed on Jan. 14, 2011.

(51) Int. Cl.
G06F 17/28    (2006.01)

(52) U.S. Cl.
CPC .................................. *G06F 17/289* (2013.01)

(58) Field of Classification Search
CPC . G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881
USPC .......................................... 704/2–8; 715/264
See application file for complete search history.

(56) References Cited

U.S. PATENT DOCUMENTS

| | | | |
|---|---|---|---|
| 4,866,670 A * | 9/1989 | Adachi et al. ..................... 704/5 |
| 7,389,221 B1 | 6/2008 | Pearson et al. |
| 7,437,704 B2 * | 10/2008 | Dahne-Steuber et al. ..... 717/100 |
| 7,987,421 B1 * | 7/2011 | Timothy et al. ................ 715/243 |
| 8,543,580 B2 * | 9/2013 | Chen et al. ..................... 707/748 |
| 2002/0111787 A1 * | 8/2002 | Knyphausen et al. ............. 704/2 |
| 2002/0193983 A1 * | 12/2002 | Tokieda et al. ................... 704/2 |
| 2006/0041590 A1 * | 2/2006 | King et al. ................. 707/104.1 |
| 2006/0074894 A1 * | 4/2006 | Remahl et al. ..................... 707/4 |
| 2006/0293876 A1 * | 12/2006 | Kamatani et al. ................. 704/2 |

(Continued)

FOREIGN PATENT DOCUMENTS

KR    2003-0045394 A    6/2003

OTHER PUBLICATIONS

International Search Report and Written Opinion issued in International Patent Application No. PCT/US2011/063696, date of mailing: Jun. 21, 2012.

*Primary Examiner* — Lamont Spooner
(74) *Attorney, Agent, or Firm* — Hyperion Law, LLC; Cynthia M. Gilbert (57) ABSTRACT

Systems and method are disclosed for dynamically creating a translated virtual website based on a machine translation of an existing website without adding any code to the source website. In one exemplary embodiment, an extension to a URL is recognized as requesting a translated website, and the request is routed to an MT server. The original-language content is retrieved, translated, and returned to the user system without any further action by the user. In a further exemplary embodiment, a secure connection can be established to enable translation of non-public websites. In a further exemplary embodiment, a crawler can index the translated website. In a further exemplary embodiment, an RSS feed returns translated content.

20 Claims, 7 Drawing Sheets

(56) References Cited

U.S. PATENT DOCUMENTS

| | | | |
|---|---|---|---|
| 2007/0136657 A1* | 6/2007 | Blumenthal et al. | 715/512 |
| 2008/0065974 A1* | 3/2008 | Campbell | 715/200 |
| 2008/0077394 A1* | 3/2008 | Fukuoka et al. | 704/8 |
| 2008/0281577 A1* | 11/2008 | Suzuki | 704/2 |
| 2009/0125497 A1* | 5/2009 | Jiang et al. | 707/4 |
| 2009/0234635 A1* | 9/2009 | Bhatt et al. | 704/2 |
| 2009/0287671 A1* | 11/2009 | Bennett | 707/4 |
| 2010/0017502 A1* | 1/2010 | Cheng et al. | 709/219 |
| 2010/0030550 A1* | 2/2010 | Travieso et al. | 704/7 |
| 2010/0169764 A1* | 7/2010 | Travieso et al. | 715/239 |
| 2010/0174525 A1* | 7/2010 | Travieso et al. | 704/7 |
| 2010/0286977 A1* | 11/2010 | Chin et al. | 704/4 |
| 2011/0202330 A1* | 8/2011 | Dai et al. | 704/2 |
| 2011/0209038 A1* | 8/2011 | Travieso et al. | 715/205 |
| 2011/0282645 A1* | 11/2011 | Khuda | 704/3 |

\* cited by examiner

METHODS AND SYSTEMS FOR THE DYNAMIC CREATION OF A TRANSLATED WEBSITE

CROSS REFERENCE TO RELATED APPLICATIONS

This application claims the benefit of priority of provisional Application No. 61/432,987, filed Jan. 14, 2011, which is incorporated herein by reference.

TECHNICAL FIELD

The present disclosure relates to methods and systems for translating at least one portion of a website from one natural language (e.g., English) to another (e.g., Japanese).

BACKGROUND

In a perfect world, organizations that transact business on the Internet in a global environment would translate all of their content into every language that their customers use. Research demonstrates that customers are dramatically more likely to consummate a transaction if the content is presented in their native language. The reality is that human translation is expensive and time consuming. Even the largest organizations with significant translation budgets are only able to translate a small fraction of their content using traditional human translation methods.

Increasingly, organizations are turning to machine translation (MT) solutions that automatically translate text segments, which may be words, phrases, or sentences, depending on the MT engine's capabilities, from one language to another. The quality of MT is nearly always inferior to human translation, however, the cost of MT is a fraction (in some cases, 1/10000th) of the cost of human translation and the results are often nearly instantaneous.

A specialized application of MT is the ability to translate content in real-time. Real-time MT provides the ability to translate dynamically-generated content. Some websites contain dynamically-generated content, such as news-feeds or user-controlled content (e.g. job postings, items for sale, etc.). An instant message or a transcript of a political debate are further examples of dynamically-generated content and for which immediate translation may be desirable.

MT can be implemented using either an on-premise solution or via software as a service (SaaS). On-premise solutions are implemented using servers that are typically co-located with the content to be translated and are typically operated by the content providers. SaaS solutions are multi-tenant platforms where many different customers are serviced by a single implementation typically provided by a third party over the Internet. Although, in SaaS, a single software executable may be used by all, each customer is usually allocated their own private "tenancy" for their data, which may be secured. Salesforce.com is a prototypical SaaS application.

Some of the better-known MT engines include: GOOGLE Translate (google.com/translate), MICROSOFT Translator (microsofttranslator.com), PROMT (promt.com), SYSTRAN (systransoft.com), and IBM n.Fluent (vvww.research.ibm.com/social/projects_nfluent.html).

While the underlying technologies of existing MT engines vary, their concepts are fundamentally the same: A user submits a translation request that contains information about the source material by either explicitly including the source text or by supplying a Uniform Resource Locator (URL) for a source document. The user further submits explicit information about the translation task, such as an identification of the target language and possibly parameters that define one or more translation options. Some engines require the user to also identify the source language whereas others can automatically detect the original language from the submitted source material. The MT engine parses the request, performs the requested task, and returns the translated content. Some MT engines are able to parse submissions and extract segments in order to translate the entire submission, whereas others require separate submission of each segment.

Real-time, SaaS, MT engines typically communicate with the requesting application via an application programming interface (API). Using an API, commercial developers can implement MT solutions that are integrated into existing applications as well as into new software applications (e.g., custom software applications developed to solve particular business problems known as purpose-built web sites). While APIs can be implemented in a variety of ways, many use Extensible Markup Language (XML) to exchange content between the client (the requesting application system) and the MT server.

Existing MT solutions have been used to "interactively" translate a given web page (for example, a Chinese website may be translated into English by the user clicking on a button for translation), and are known to be useful for looking up a given phrase, or to translate a document or email.

Existing MT solutions are limited because they either require the end user to visit a particular website and input the data to be translated or they require the developer to add code (e.g., JavaScript) to the webpage allowing translation. The necessity of having developers include code to direct the translation can be inconvenient. For example, including such code can be cumbersome in organizations where the content of the website is controlled by one group (e.g., Marketing) and the hosting operations are controlled by another (e.g., the IT department, or even a third party). The inconvenience is especially apparent and difficult to overcome where a content management system (CMS) is used that is incompatible with the translation APIs. Moreover, translated websites where code is used to interactively translate the website cannot be indexed by search engines. A further limitation to the interactive translation approach with an SaaS MT solution is that the content is transmitted over the public Internet, making this approach less desirable for sensitive intranet websites, for one example.

There is a need for methods and systems that facilitate website translation where translation code does not need to be added to the website. Solutions that facilitate indexing of translated content by search engine crawlers are also desirable. Also desirable is a secure solution appropriate for translating proprietary, confidential, or sensitive enterprise content with an SaaS MT engine.

SUMMARY

The present disclosure includes exemplary systems and methods for dynamically translating an original-language website or for dynamically translating an original-language RSS feed. In some embodiments, performing the methods disclosed herein does not require additional hardware, software, or firmware to be included on a server providing the original-language website or the RSS feed.

One exemplary method for translating an original-language website comprises receiving a request at a machine translation (MT) server for a translated website requested by a user, wherein the user request comprises a base uniform resource locator (URL) identifying the original-language website, and an extension identifying a target language. Original content associated with the original-language website is retrieved, the original content into the target language using an MT engine; and the translated content is returned to the user system. The original-language website may be reassembled by replacing original content with the translated content. In some embodiments, the extension is a country code top-level domain. Further, in some embodiments, the base URL may be the same as a URL associated with the original-language website at a DNS server.

In some embodiments, a secure connection is established between the MT server and a host system associated with the original-language website, such that original content and translated content can be transmitted via the secure connection. In some embodiments, original-language advertisements in the original-language content may be identified and replaced with target-language advertisements. In yet other embodiments, target-language advertisements may be selected based on session information associated with a user.

In some embodiments, the original-language website comprises multiple embedded URLs, and a crawler requests the translation of the multiple embedded links. The translated content associated with the multiple embedded links may be stored in a catalog.

An exemplary method for dynamically translating original-language RSS feed content comprises receiving a request at an MT server for translated RSS feed content, wherein the request identifies an original-language RSS feed and a target language, retrieving original-language RSS feed content associated with the identified original-language RSS feed, translating the original content into the target language using an MT engine, and returning translated content to the requesting application. In some embodiments, the target language is identified in the request by a query string.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The detailed description will refer to the following drawings, wherein like numerals refer to like elements, and wherein.

DESCRIPTION OF EXEMPLARY EMBODIMENTS

The following description refers to the accompanying drawings. Wherever possible, the same reference numbers will be used throughout the drawings to refer to the same or similar parts. While several exemplary embodiments and features of the inventions are described herein, modifications, adaptations and other implementations are possible, without departing from the spirit and scope of the inventions. For example, substitutions, additions or modifications may be made to the components illustrated in the drawings, and the exemplary methods described herein may be modified by substituting, reordering, or adding steps to the disclosed methods. Accordingly, the following detailed description does not limit the inventions. Instead, the proper scope of the inventions is defined by the appended claims.

Within this specification, a "computer system" broadly refers to any stand-alone computer such as a PC, laptop, handheld media player, mobile phone, or series of computers connected via a network, and includes all internal processors, devices, memories, and functions. Additionally, a computer system includes any external devices such as displays, input devices, or memories such as external drives, databases, or enterprise storage systems containing data and/or instructions accessed or used by the computer or series of computers. A computer system further includes any communication links between the computer(s) and external devices or memories and any communication links between the computers.

Figure 1:
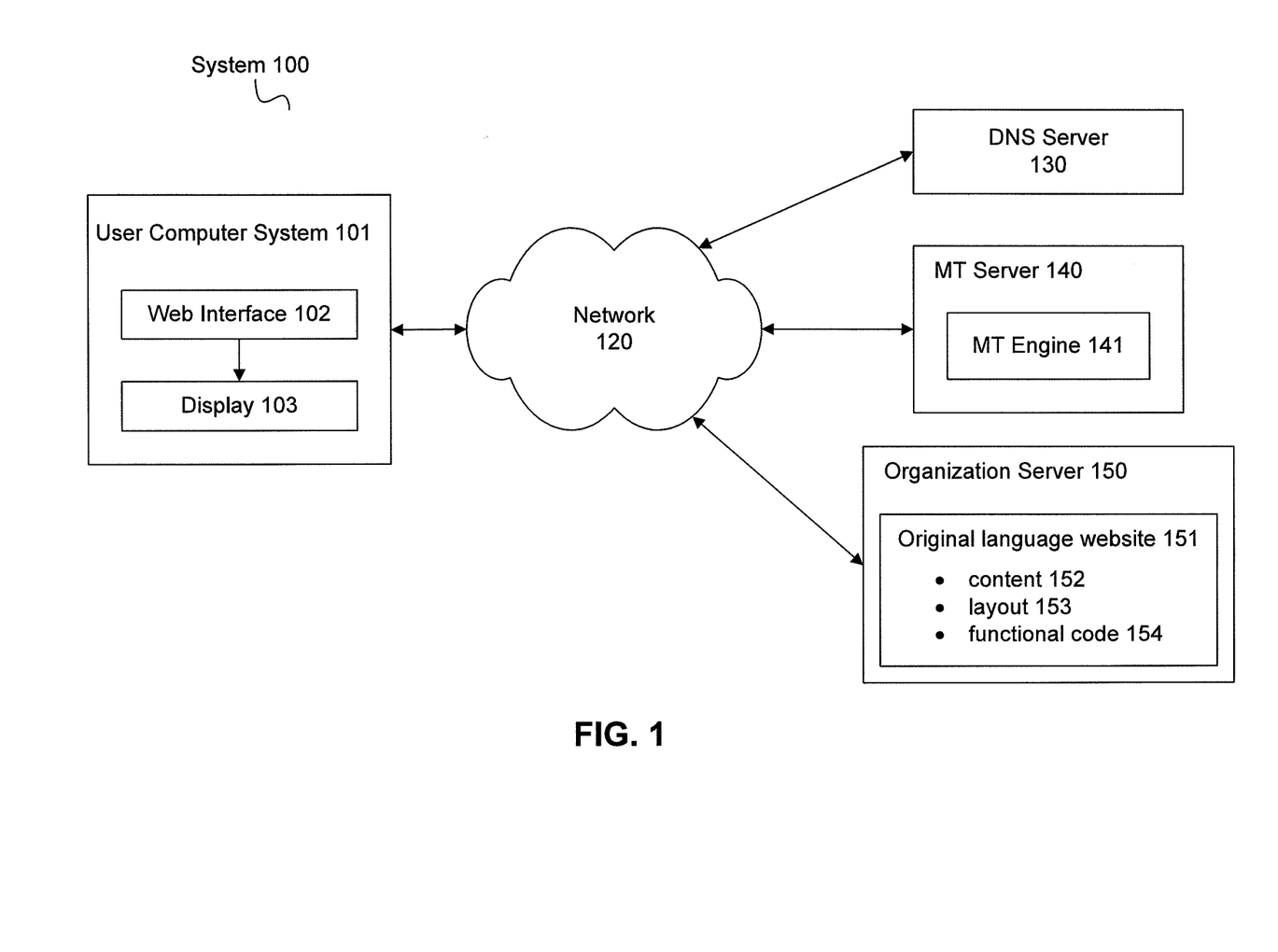
FIG. 1 illustrates an exemplary system for performing the principles of the inventions described herein.

FIG. 1 illustrates an exemplary system 100 for performing the principles of the inventions described herein. As shown in FIG. 1, one exemplary system comprises a user computer system 101, a Domain Name System (DNS) server 130, an MT server 140, and an organization server 150, operatively connected by a network 120. Network 120 may also be used by any of the components in system 100 to communicate with other computer systems or devices not shown. Network 120 may be, for example, the Internet or any other type network, and may include one or more public or private wired or non-wired networks, or any combination thereof.

User computer system 101 may be any computer system having a web interface 102, such as a web browser, that allows a user to view an internet or intranet website on a display 103, which may be, for example an LCD display.

Exemplary DNS server 130 may be any computer system configured to resolve IP addresses for websites, using known processes.

Exemplary MT server 140 may be any computer system configured to perform a machine translation. Organization server 150 is any computer system configured to host or provide content for a website viewable at user computer systems, such as at user computer system 101. In some embodiments, MT server 140 may be operated by the same entity that operates organization server 150, and further may be implemented as part of organization server 150. In some embodiments, MT server 140 may operate as an SaaS solution. MT server 140 may include modules or programs, and any memories and databases associated therewith to facilitate translations.

MT engine 141 performs translations. MT engine 141 may be hardware, such as circuitry or a processor within the MT server 140 computer system, or software, or any combination thereof.

FIG. 1 shows exemplary original-language website 151 being served from organization server 150. Original-language website 151 may be an Internet accessible website or may be an intranet-only website, which is secured and viewable only by user computer systems and/or users with the proper permissions. Original-language website may be made up of one or more original-language webpages. Web pages may comprise content, layout information, functional code, browser specific directions, and other information. Functional code may be, for example, JavaScript, or any other code that provides functionality to the web page. Browser-specific directives may be, for example, cookies or image links. Exemplary content 152, layout 153, and functional code 154 make up exemplary original-language website 151 in FIG. 1. Organization server 150 may, in some instances, be behind a firewall (not shown), and further, a VPN server or other gateway may facilitate access to organization server 150 and original-language website 151 from points external to the private network that organization server 150 may be a part of.

For purposes of explanation only, certain aspects and embodiments are described herein with reference to the exemplary components illustrated in FIG. 1. The functionality of the illustrated components may overlap, however, and may be present in a fewer or greater number of elements and components. Further, all or part of the functionality of the illustrated elements may co-exist or be distributed among several geographically-dispersed locations. For example, MT server 140 and organization server 150, although shown as separate entities in FIG. 1, may be parts of the same entity and may be implemented using a single computer system. For another example, user computer system 101 and organization server 150 may be geographically co-located. Moreover, embodiments, features, aspects and principles of the present invention may be implemented in various environments and are not limited to the illustrated environments.

The exemplary embodiments described herein allow a website to be translated in real-time without the addition of any code to that website. Methods and systems described herein may be useful, for instance, to a marketing group that desires to publish content but does not control the hosting technology. Methods and systems described herein may also be useful to an individual who desires to create a clone of a website or webpage in a language that he or she could read. For example, a given company's employee who speaks only German might wish to create a virtual website of the company's public or private web pages that are only available in English.

Figure 2:
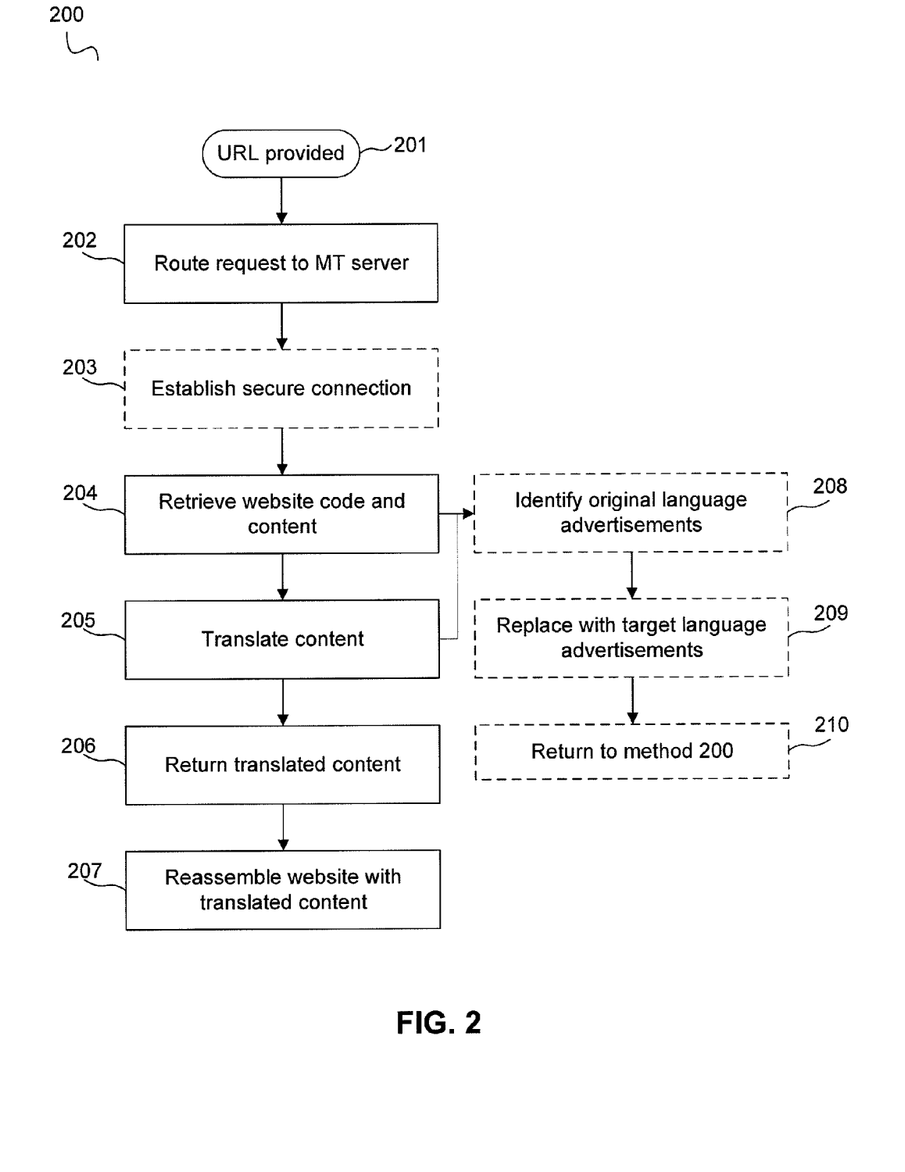
FIG. 2 is a flow chart illustrating an exemplary method for the translation of a website consistent with the principles of the inventions described herein.

FIG. 2 shows exemplary method 200 for dynamically translating a website in real-time. In stage 201, a URL is provided. For example, a user may input a URL of website. A user may, for example, input a URL using user computer system 101 of FIG. 1 using web interface 102. In some embodiments, the URL is comprised of a base URL associated with an existing original-language website and an extension that identifies a target language. For example, original-language website 151 may be identified by the base URL: http://www.original-language-website.com/. The extension may be any text that can be interpreted to identify a target language, and typically would be appended to the end of the base URL, although other configurations are possible. A target URL identifying a webpage or website for translation into a target language, including the extension, can be anything that the organization requesting translation desires. The only requirement is that the domain be available.

In some embodiments, the extension is a two-letter indicator corresponding to a country code top-level domain (ccTLD). For example, the extension may be .fr, which is known as the ccTLD for France. In such embodiments, the ccTLD extension would identify the target language as the one spoken in the corresponding country (e.g., .fr would identify the target language of French, .fi would identify the target language of Finnish, .es would identify the target language of Spanish, etc.). To request a Spanish language translation of original-language website 151, for example, a user may enter one of several URLs (e.g., http://www.original-lanauage-website.com.es or http://www.original-language-website.com.mx).

The request, sent by the user computer system, may be received by a server. The request may be received by DNS server 130 of FIG. 1, for example. The DNS server may be configured to attempt to resolve the location (generally, an IP address) of the requested website identified by the URL using known methods. In some embodiments, the DNS server optionally may be configured to determine whether an actual website for http://www.original-language-website.com.extension exists. If it does, the request may be routed to the existing website. If it does not exist, the request may be routed to an MT server. For example, the request may be routed to an MT server such as MT server 140 of FIG. 1. In stage 202, the request is routed to an MT server.

In some embodiments, the DNS record associated with http://www.original-language-website.com.extension may be configured to resolve the URL to a server, such as organization server 150 of FIG. 1, or some other server not shown, that would then route the request to an MT server. One advantage to resolving to a server other than organization server 150 is that the organization server itself then does not require any additional hardware, software, or firmware to take advantage of the methods and systems disclosed herein to accomplish translation of the original-language website(s) that it hosts. Such configuration may be accomplished by creating an appropriate CNAME record for http://www.original-language-website.com/extension, which is propagated through the Internet to the various DNS servers. A CNAME record is a type of DNS record used to point one DNS entry at another DNS entry. In this exemplary embodiment, a new CNAME record entry would be created for each source and target URL pair (e.g., for each extension or target-language). For example, a CNAME record would be created for http://www.original-language-website.com.extension_1 that points to the location of a server that a customer would access, which interprets the URL as a request to translate the original-language website, found at http://www.original-language-website.com, into the target language identified by "extension_1".

In stage 204, the website code and content for the original-language-website is retrieved. In some embodiments, the server makes a server-side HTTP request for the original-language webpage and accepts the entire HTML "envelope." The HTTP request may be made using a programming language capable of opening an Internet web-page such as C# or Java, requesting the content, and storing the returned content on the requesting server. The server may then separate layout information, functional code, and browser-specific directives from the textual content of the webpage. Further, in stage 204, the textual content may be formatted and sequenced into segments appropriate for translation by the MT engine.

After a given segment is ready for translation, it may be dispatched to an MT engine for translation. Alternatively, segments may be stored and sent to the MT engine in groups. In stage 205, the content is translated using MT software. Existing MT software may be used at this stage, such as GOOGLE Translate (google.com/translate), MICROSOFT Translator (microsofttranslator.com), PROMT (promt.com), SYSTRAN (systransoft.com), and IBM n.Fluent, or any other software capable of translating text. In many embodiments, method 200 is performed on a page-by-page basis, and only the requested webpage identified by the base URL is translated initially.

In stage 206, the translated content is returned to the user computer system or to the server. Translated segments, or groups of segments, may be returned from the MT engine in a different order than they were sent. In stage 207, the webpage is reassembled with the translated content using the layout information, functional code, and browser specific directives previously retrieved. In most embodiments, the translated segments are reassembled in the order that they were found in the original webpage to preserve readability. The reassembly in stage 207 may be performed, in some embodiments, prior to returning the translated content to the user system. In such embodiments, the entire webpage, with the translated content may be returned to the user system. In some embodiments, the user system receives the translated content and reassembles the web page. A browser in the user system may be configured to perform the reassembly.

In some embodiments, after the first translated segment has been returned from the MT engine, it is possible for the browser of the user system to start rendering the translated website by dynamically creating a new webpage. The content of the webpage is framed by the saved layout, functional code, and browser directives from the original-language webpage. As translated segments are returned from the MT engine to the user system, they may be sequentially added to the appropriate places on the webpage on the user system's browser window.

In some embodiments, a dynamic banner (or other text) can be added to the webpage to indicate to the user that the webpage is being translated. The dynamic banner may display the progress of the translation, such as a percentage of the page that has been translated, a percentage of the page that is left to be translated, and/or the time remaining for complete translation. Further, in some embodiments a banner (or other text) may be displayed that indicates that the webpage is a translated version of the original-language webpage. A banner (or other text) may display options for reverting to the original language, or may give instructions as to how to revert to the original language. In some embodiments, moving the curser over the translated text may cause the display to show the translated content in the original language.

To improve the rendering speed of the page, an "ignore" algorithm may be implemented to bypass slowly translating segments and to display them in the original language. In these cases a re-try algorithm may be implemented to re-submit segments that failed to translate after some time-out period. In some embodiments, segments that could not be translated would simply be displayed in the original language or space-holder characters could be displayed in place of text. For example "***" may replace any segments that could not be translated. In some embodiments, moving the curser over the space-holder characters may display the content in the original language. In some embodiments, moving the curser over the translated content may display the content in the original language.

In some embodiments, a service level agreement between the MT provider and its customer (e.g., the requesting party) may dictate the parameters of the translation to be provided. For example, an agreement may establish a maximum time allowable for the translation, such that if the maximum time elapses for a given segment, the segment will not be translated. Depending on the service level agreement with the MT provider it is theoretically possible that some segments may not be returned at all.

Method 200 may be modified to include optional stage 203 when security is desirable. In stage 203, a secure connection is established. For example, a secure channel such as an encrypted virtual private network (VPN) channel may be established. This secure connection could be used for transmitting and receiving content originating from the organization's secure website behind a firewall to and from an MT server. For example, stages 204 and 206 may be performed using the secure connection. Using these techniques, content may be translated by a multi-tenant SaaS solution, but the content is never transmitted in an unencrypted format, thus allowing the shared solution to be used by a content owner that wishes to preserve security of its content.

In embodiments requiring additional security, the MT engine can be configured to only "listen" for requests for secure content and return translated secure content only to requests originating from a secured channel. Further, in some embodiments, caching may be disabled at the MT engine so that sensitive information would not be stored.

Secure embodiments may be useful, for example, to an organization wishing use an MT solution to allow confidential information on its secured original-language systems to be viewed by employees that do not speak the original language. For example, a hypothetical organization working on a design document with engineers located in Taiwan may need to collaborate with engineers in the United States. The engineers in Taiwan could enter their notes into a web-based collaboration system using traditional Chinese text. This collaboration system may be behind the organizational firewall and may only be available to employees of the organization. The methods and systems disclosed herein may be used to enable the engineers in the United States to view the Taiwanese notes in English.

In some embodiments, to facilitate a secure real-time MT translation solution, an organization may license an MT engine from a hosted provider with which it can establish a trusted relationship. In those embodiments, certain setup steps may be completed before the solution is deployed. For example, a DNS record for the secure website may be created. The DNS (or CNAME) record would be local to the licensing organization's domain, such that an exemplary secure URL, (e.g., secure.original-language-website.extension), and would resolve to an IP address that is only available to computers behind the organization's firewall. The routing may be accomplished using standard DNS routing techniques where a DNS record would route requests to a designated IP address for the MT server.

In one exemplary "secure" embodiment, a user on the organization's intranet requests a French version of a given secure webpage by entering a URL, such as secure.original-language-website.fr. In this example, secure.original-language-website.fr corresponds to a "private" IP address, such as 192.168.x.x, meaning that it cannot be resolved on the public Internet. Such addresses may only be able to be resolved on an organizations Intranet. In this exemplary embodiment, the DNS server, having been configured to resolve the address as described above, locates the DNS record and routes the request to an SaaS MT server at a public IP address secured to "listen" to requests from the organization's proxy server. The MT server establishes secure connection, such as a VPN, to the organization allowing the user access to content behind organizational firewall. The MT server retrieves the webpage code content from secure.original-language-website.com, translates the content, and returns the translated content to the requesting user using the secure connection.

As shown in FIG. 2, method 200 may be modified, for example, to enhance the translated website with advertisements targeted to the requesting user. The optional stages 208, 209, and 210 could be performed at any time during the performance of method 200, and are shown in FIG. 2 for illustrative purposes, as being performed following stage 204. In stage 208, original-language advertisements are identified on the requested original-language webpage implicated by the URL entered in stage 201. In stage 209, one or more original-language advertisements are replaced with one or more target-language advertisements. Target-language advertisements may be, for example, translated advertisements corresponding to the original-language advertisements. Target-language advertisements, may be for another example, different advertisements that were originally been created in the target language. In stage 210, method 200 continues following the replacement of the original-language advertisements with target language advertisements.

In some embodiments, information about the requesting user, including their location and browser capabilities, may be obtained using standard browser technology. This information might include the user's IP address, the installed default language on the user's PC, as well as a myriad of other information about the capabilities of their PC and browser. For the purpose of this disclosure, this data is referred to as session information. In some embodiments, an organization may enhance its website based on a user profile, such as the session information, or certain portions thereof. For example, content may be added, modified, or deleted based on the session information of the requesting user, the source material, and the translated content.

In some embodiments, one advertisement at a time may be replaced and rendered as it becomes available to reduce delays in viewing the webpage. In some embodiments, the target-language advertisements may be selected based on a user profile associated with the user entering the URL in stage 201. For example, advertisers may specify certain target audience characteristics that it hopes will view their advertisements. When one or more parameters of the user profile corresponds with one or more of the target audience characteristics, the associated advertisement with those characteristics may be selected to replace the original-language advertisement in stage 209. In some embodiments, the target-language advertisements may be selected based on the user's location, which, in some embodiments, may be determined based on the IP address of the user's computer system and may be determined from the session information.

In one exemplary embodiment, a German speaking user located in Austria who is interested in English news, requests content from the BBC website, bbc.co.uk, on an exemplary URL www.bbc_in_german.com. As described in previous exemplary embodiments, the DNS record (or CNAME record) associated with bbc_in_german.com resolves to a server implementing the methods disclosed herein. When the request is received by the server hosting bbc_in_german.com, the user's session information may be obtained. This session information can then be used by the server to augment (add, remove, or edit) the information of the original website. In this example, ads from bbc.co.uk that are appropriate for an English audience could be stripped away and replaced by others that make sense to a German speaker based in Austria. In another example, a user that is requesting a webpage having airline flight information could have all flight times automatically converted to their current time zone using the methods disclosed herein.

Figure 3A:
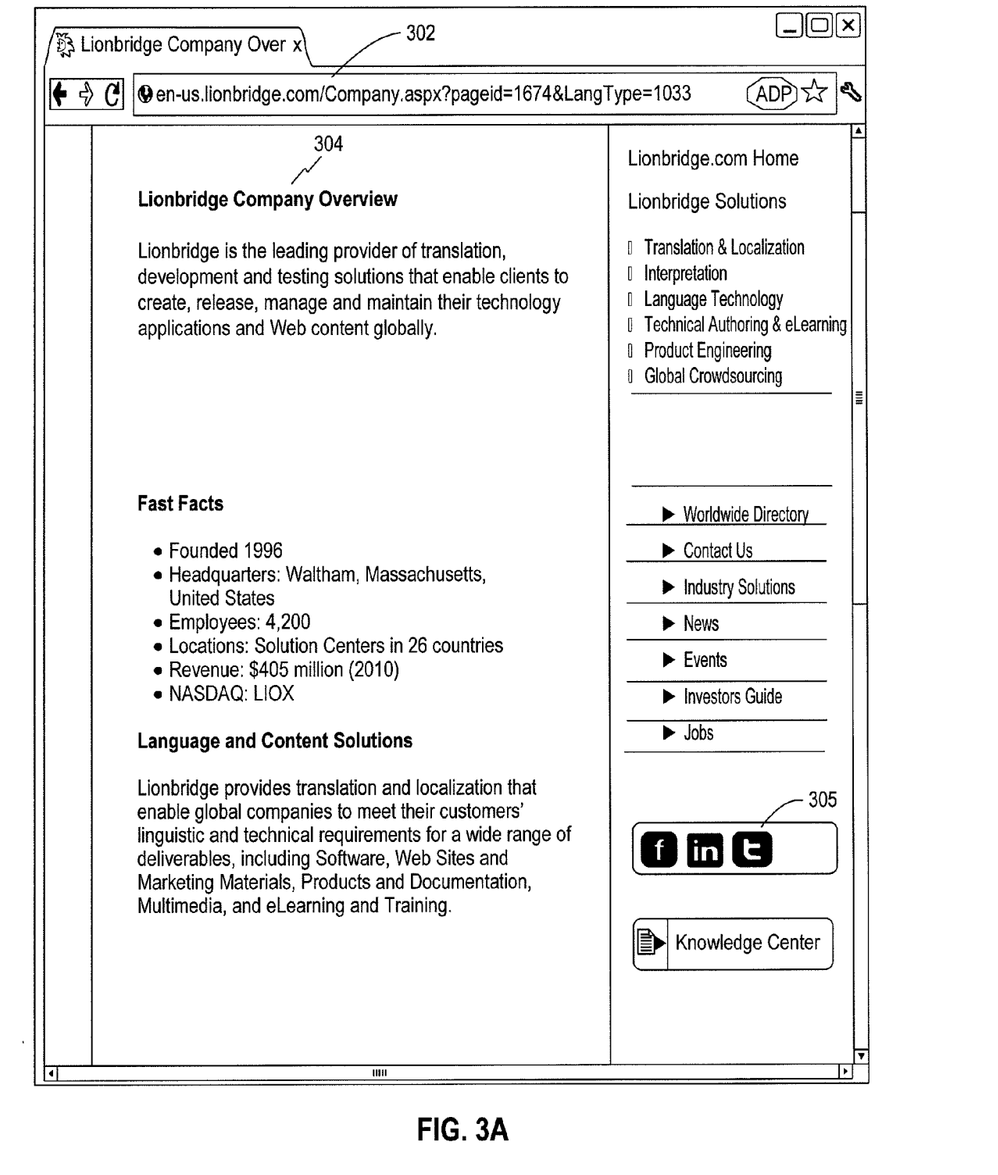
FIG. 3A shows an exemplary webpage.
Figure 3B:
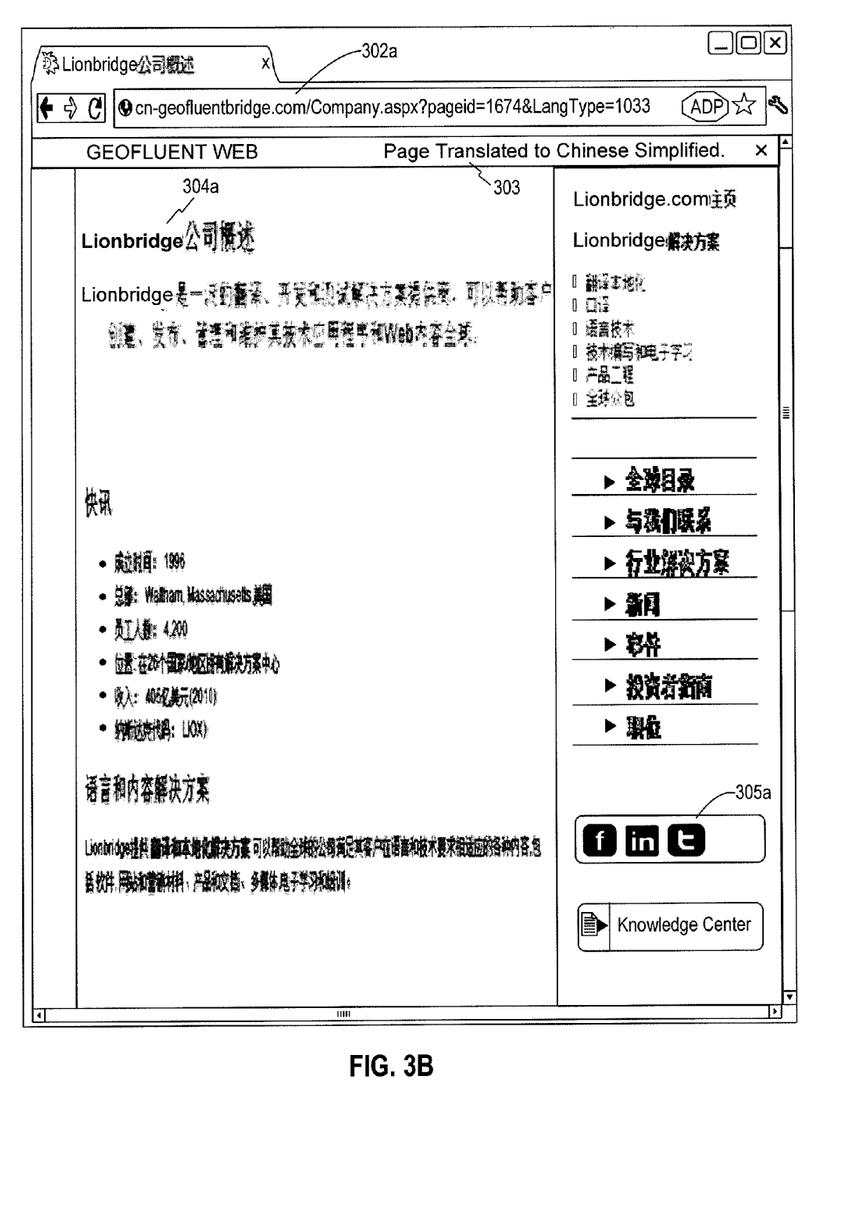
FIG. 3B shows an exemplary translated webpage consistent with the principles of the inventions described herein.

FIG. 3A shows an exemplary original-language webpage 301. FIG. 3B shows a translated target-language (simplified Chinese) webpage 301a created in accordance with the principles of the inventions disclosed herein. The exemplary URL 302 for the original-language webpage 301 is: en-us.lionbridge.com/, and in this exemplary embodiment, a user has entered URL 302a, cn-geofluent.lionbridge.com, to obtain target-language webpage 301a, which is a translated version of original-language webpage 301.

In some embodiments, text that cannot be translated, or that may be designated not to be translated, may appear in the original language. For example, FIGS. 3A and 3B show that the text "Lionbridge" (304 and 304a) appears in English on both original-language webpage 301 and target-language webpage 301a. Exemplary text 303 in FIG. 3B indicates that the webpage has been translated into simplified Chinese. Exemplary target-language webpage 301a maintained the formatting, layout, and functionality of original-language webpage 301, as shown in FIG. 3B. For example, functional buttons 305 from the original-language webpage 301 in FIG. 3A are maintained in target-language webpage 301a as functional buttons 305a in FIG. 3B.

Figure 4:
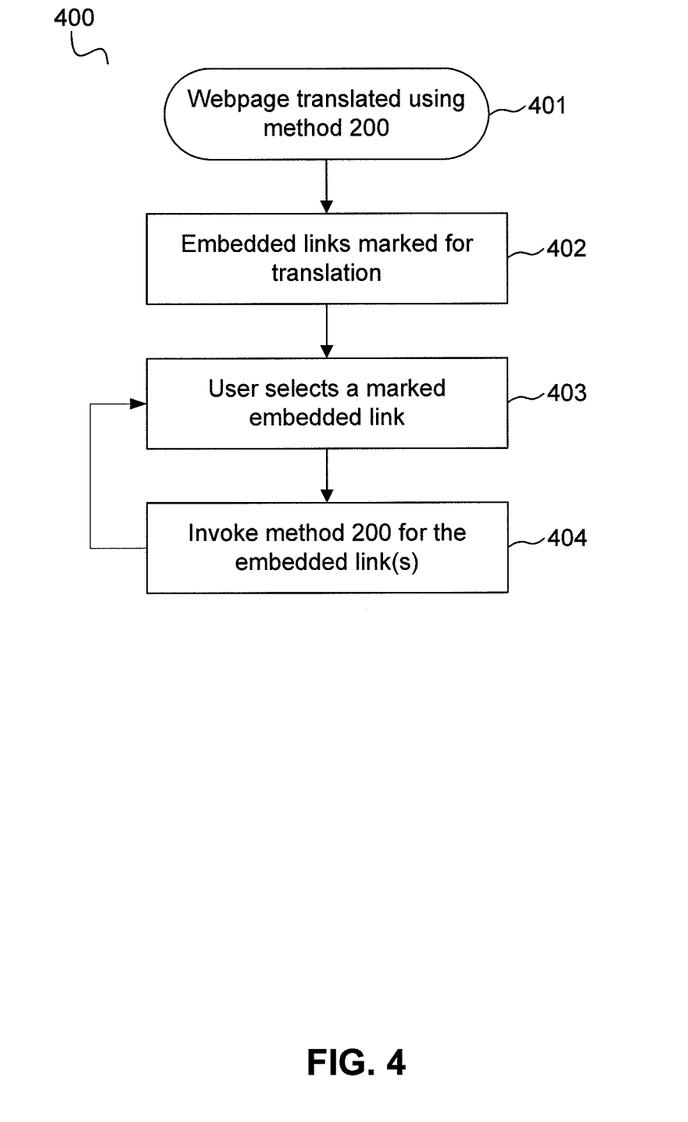
FIG. 4 is a flow chart illustrating an exemplary method for the translation of a web page containing embedded links, consistent with the principles of the inventions described herein.

FIG. 4 is an exemplary method 400 for translating a webpage containing embedded links. In stage 401, an original-language webpage is translated. This translation may be accomplished using method 200, for example. In stage 402, which may be performed simultaneously or subsequent to stage 401, one or more embedded links (also known as relative links or "deeper links") are marked for translation. For example, a link on the original-language website such as original-language-website.com/table-of-contents/ would be seamlessly returned with the extension inserted or appended, (e.g., as original-language-website.com.extension/table-of-contents/). In stage 403, a user selects a marked embedded link, which results in the invocation of method 200 in stage 404. In the forgoing example, the invocation of method 200 would result in the translation and display of the content on the table of contents webpage when the embedded link is selected. For each embedded link selected, method 200 may be performed. In some embodiments, stage 403 may be omitted, and method 200 may automatically be performed for each webpage implicated by the embedded links using the extension indicated in the URL request for the top-level webpage. For example, each of the webpages implicated by the embedded links may be translated without requiring any action by the user following the translation of the page on which the embedded link appears. One benefit to embodiments where method 200 is automatically performed for each of the embedded links, is that there may be less lag-time between when a user selects an embedded link and the translated content is rendered.

The methods and systems disclosed herein may facilitate the indexing and searching of machine-translated content. Many organizations also appreciate that their websites are indexed by third party search engines for searchability using crawlers, and some organizations perform their own indexing of public or private pages to enable searchability.

Figure 5:
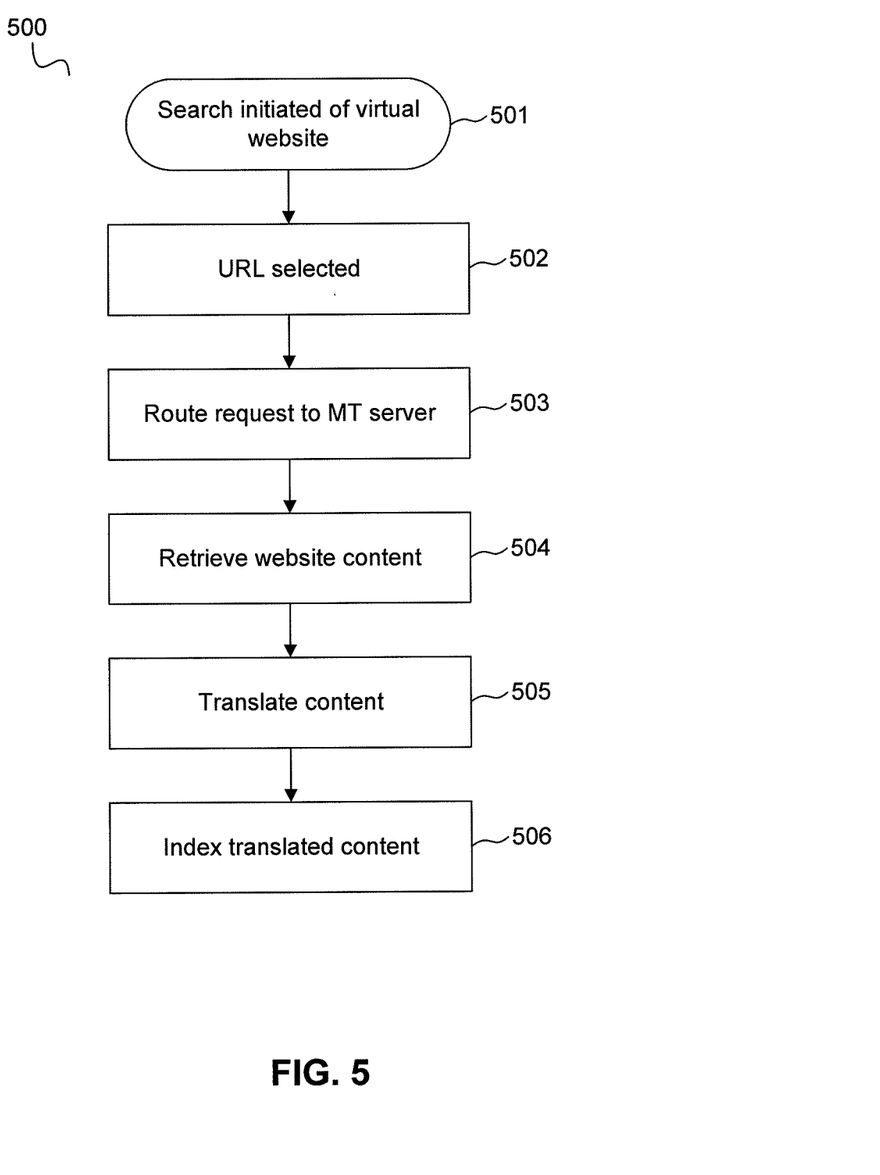
FIG. 5 is a flow chart illustrating an exemplary method for the indexing of translated content for a virtual translated website, consistent with the principles of the inventions described herein.

Translated content from a URL may be loaded into a search engine by adding the domain to the search engine's index, which causes its "spiders" to crawl the translated content. FIG. 5 shows an exemplary method 500 in which a search engine is used to index the translated content of an original-language website (e.g., original-language-website.extension), which can be thought of as a virtual website. In stage

501, a search is initiated. In stage 502, a URL (the top-level URL, or another URL associated with the virtual website) is selected for indexing by a crawler.

The request by the search engine (e.g., by its crawler) to parse the site is routed to an MT server in stage 503, and in stage 504 the content is retrieved. In some embodiments, only the content is indexed, and therefore, in those embodiments, layout information, scripts, and other functional code can be ignored. In some embodiments, a search is initiated of the root page of a website, and the search engine may recursively traverse the embedded links on the website, attempting to visit every embedded link on the page and automatically initiating a translation and indexing of each. Thus, stages 502-506 may be repeated for each link on the page. In some embodiments, the search engine may attempt to index a translation of every page on a given website unless there is a directive not to crawl a given page or section of a website.

Once the translated content is available in a search engine's catalog/database, existing tools can be used to search for terms of interest in the target language or to create email alerts. For example, a sports agent in the United States (that only speaks English) might want to create email alerts on a Japanese pitching prospect's performance tied to news "clippings" from local newspapers that are only available in Japanese. If the newspapers' websites are translated to English and indexed in accordance with the methods disclosed herein, the sports agent would be able to create such an email alert in English.

Method 500 may also be used to index translated information from a secure site. For example, a given organization may have a local search engine that performs method 500 to create a searchable catalog of all information on its corporate Intranet, which may be behind a firewall such that none of the content is available on the public Internet.

Figure 6:
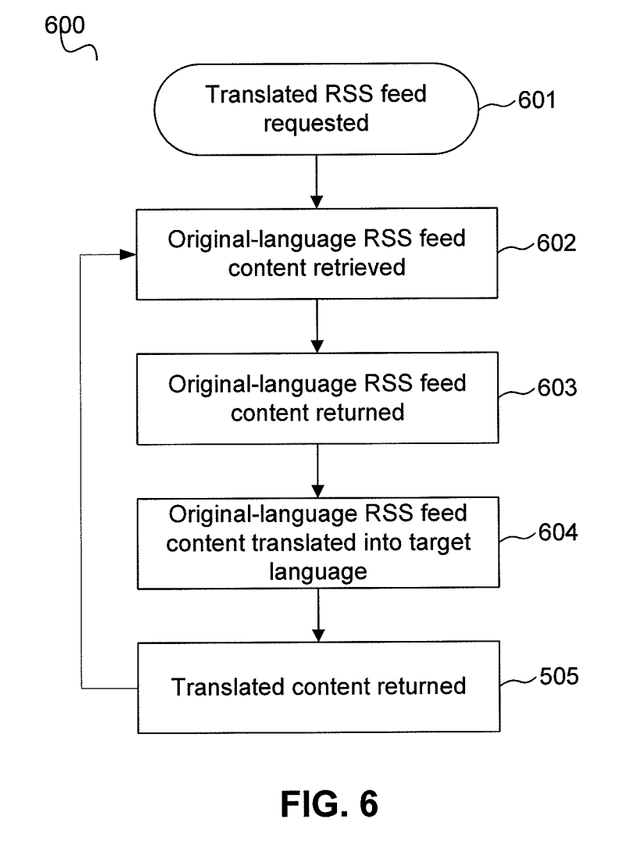
FIG. 6 is a flow chart illustrating an exemplary method for the translation of an RSS feed consistent with the principles of the inventions described herein.

FIG. 6 shows an exemplary method 600 in which the methods and systems disclosed herein are used to translate RSS (Really Simple Syndication) feed content from one language to another. RSS is a family of known XML-based web feed formats, recognized by web browsers, and used to publish frequently updated content. In addition, many dedicated "reader" applications exist to provide enhanced functionality that allows users to organize, sort, search, etc., the RSS content. Generally, users make a single request for an RSS feed, and receive the desired content periodically or continually as it becomes available. Using the methods and systems disclosed herein, a single request for a translated RSS feed would provide the user with translated content. The translated results may be appended to the original feed, may replace the original feed, may be mixed with the original feed, or any combination of these.

In step 601 a translated RSS feed is requested. In one exemplary embodiment, the translated RSS feed is requested by providing a base URL identifying the location of the original-language source feed together with an extension identifying the desired language. For example, an end-user supplies an RSS feed URL such as http://rss.news-outlet.com/rss/news-outlet_topstories_extension_2.rss identifying an original-language RSS feed for translation into the language identified by extension_2. In some embodiments, a DNS server may resolve the address, http://rss.news-outlet.com/rss/news-outlet_topstories_extension_2.rss, to a server that would route the request to an MT server, or directly to an MT server.

In some embodiments, the extension may be in the form of a query string that identifies the target language. For example, the extension may be a query string such as "?src=&dft=fr" or "?src=&dft=french". In such embodiments, it may be preferable to append the string after the ".rss" in the URL such that the DNS server would ignore the query string when resolving the request. Further, in such embodiments, the base URL may be a URL that is different than the original-language RSS URL, so that a DNS server would not route the request to the original-language RSS feed server and would instead route the request to a server recognizing the request as one for a translated RSS feed. In some embodiments, the end-user could be a person or another computer, such as a content management system (CMS) that re-publishes the content.

In step 602, the original-language feed content is retrieved from the source location. For example, the MT server may retrieve the original-language feed content via an HTTP request. In step 603, the original-language RSS feed content is returned in RSS/XML format via HTTP to the MT server. In step 604, the original-language RSS feed content is translated from the original language to the target language by an MT engine. In step 605, the translated content is returned to the requesting application via HTTP using RSS/XML. The return to the requesting user may be through an RSS application, via a webpage, or via some other mechanism that enables the user to view the translated content.

Generally, RSS is a pull-based protocol, and thus the translations in the above-described exemplary embodiment usually occur on demand. Each time an RSS application requests a translated feed, the original source language RSS feed content is retrieved, the translation of that content occurs, and the translated content is delivered to the requesting application.

Although the inventions have been described with reference to exemplary embodiments, persons skilled in the art will recognize that changes may be made in form and detail without departing from the spirit and scope of the inventions. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method for dynamically translating an original-language website, the method comprising:
   receiving a request at a machine translation (MT) server for a translated website requested by a user, wherein the user request comprises a base uniform resource locator (URL) identifying the original-language website, and an extension identifying a target language;
   retrieving original content associated with the original-language website;
   translating at least one segment of the original content into the target language using an MT engine, wherein the translating comprises:
      determining to bypass translation of a first segment of the original content upon a determination that a translation time associated with the first segment of the original content will likely exceed a predetermined threshold identified in a service level agreement,
      bypassing translation of the first segment of the original content into the target language upon the determination that the translation time will likely exceed the predetermined threshold,
      translating a second segment of the original content; and
   returning the translated second segment of the original content to a user system.

2. The method of claim 1, wherein the extension is a country code top-level domain.

3. The method of claim 1, wherein returning the translated content further comprises reassembling the original-language website by replacing original content with the translated content.

4. The method of claim 1, further comprising establishing a secure connection between the MT server and a host system associated with the original-language website, and
wherein retrieving original content and returning the translated content are accomplished via the secure connection.

5. The method of claim 4, wherein the original-language website comprises multiple embedded URLs,
wherein the user comprises a crawler,
wherein the method is performed for the multiple embedded URLs, and
wherein the returned translated content for the multiple embedded URLs is stored in a catalog.

6. The method of claim 1 further comprising:
identifying original-language advertisements in the original-language content, and
retrieving target-language advertisements; and
wherein returning translated content to the user system further comprises returning the target-language advertisements in place of the original-language advertisements.

7. The method of claim 6, wherein retrieving target-language advertisements further comprises examining session information and selecting target-language advertisements based on the session information.

8. The method of claim 1, wherein the original-language website comprises multiple embedded URLs,
wherein the user comprises a crawler,
wherein the method is performed for the multiple embedded URLS, and
wherein the returned translated content for the multiple embedded URLs is stored in a catalog.

9. The method of claim 1, wherein performing the method does not require additional hardware, software, or firmware to be included on a server providing the original-language website.

10. The method of claim 1, wherein the base URL is the same as a URL associated with the original-language website at a DNS server.

11. A system for dynamically translating an original-language website, the system comprising:
a server having an interface for receiving a request from a user system for a translated website,
wherein the user request comprises a base URL identifying the original-language website and an extension identifying a target language,
wherein the request is routed to an MT server configured to retrieve original content associated with the original-language website,
wherein an MT engine is configured to translate at least one segment of the original content into the target language, wherein being configured to translate comprises:
being configured to determine to bypass translation of a first segment of the original content upon a determination that a translation time associated with the first segment of the original content will likely exceed a predetermined threshold identified in a service level agreement,
being configured to bypass translation of the first segment of the original content into the target language upon the determination that the translation time will likely exceed the predetermined threshold, and
translating a second segment of the original content; and
wherein the MT server is configured to return the translated second segment of the original content to the user system.

12. The system of claim 11, wherein the extension is a country code top-level domain.

13. The system of claim 11, wherein returning the translated content comprises reassembling the original-language website by replacing original content with the translated content.

14. The system of claim 11, wherein the server is configured to establish a secure connection with a host system associated with the original-language website, and
wherein the MT server is configured to retrieve the original content and to return the translated content using the secure connection.

15. The system of claim 11, wherein the server
identifies original-language advertisements in the original-language content,
retrieves target-language advertisements, and
wherein the MT server being configured to return translated content to the user system further comprises returning the target-language advertisements in place of the original-language advertisements.

16. The system of claim 15, wherein retrieving target-language advertisements further comprises examining session information and selecting target-language advertisements based on the session information.

17. The system of claim 11, wherein the original-language website comprises multiple embedded URLs, and wherein the user system comprises a crawler.

18. A method for dynamically translating original-language RSS feed content, the method comprising:
receiving a request at an MT server for translated RSS feed content, wherein the request identifies an original-language RSS feed and a target language;
retrieving original-language RSS feed content associated with the identified original-language RSS feed;
translating the at least one segment of original-language RSS feed content into the target language using an MT engine, the translating comprising:
determining to bypass translation of a first segment of the original-language RSS feed content upon a determination that a translation time associated with the first segment of the original-language RSS feed content will likely exceed a predetermined threshold identified in a service level agreement
bypassing translation of the first segment of the original-language RSS feed content into the target language upon the determination that the translation time will likely exceed the predetermined threshold, and
translating a second segment of the original content; and
returning the translated second segment of the original content to a requesting application.

19. The method of claim 18, wherein performing the method does not require additional hardware, software, or firmware to be included on a server providing the original-language RSS feed content.

20. The method of claim 18, wherein the target language is identified in the request by a query string.

\* \* \* \* \*